(12) United States Patent
Saygili

(10) Patent No.: US 12,465,088 B2
(45) Date of Patent: Nov. 11, 2025

(54) AEROSOL GENERATING SYSTEM AND CARTRIDGE WITH LEAKAGE PROTECTION

(71) Applicant: PHILIP MORRIS PRODUCTS S.A., Neuchatel (CH)

(72) Inventor: Ali Murat Saygili, Neuchatel (CH)

(73) Assignee: Philip Morris Products S.A., Neuchatel (CH)

( * ) Notice: Subject to any disclaimer, the term of this patent is extended or adjusted under 35 U.S.C. 154(b) by 496 days.

(21) Appl. No.: 17/294,841

(22) PCT Filed: Dec. 6, 2019

(86) PCT No.: PCT/EP2019/084036
§ 371 (c)(1),
(2) Date: May 18, 2021

(87) PCT Pub. No.: WO2020/115302
PCT Pub. Date: Jun. 11, 2020

(65) Prior Publication Data
US 2022/0015433 A1    Jan. 20, 2022

(30) Foreign Application Priority Data
Dec. 7, 2018  (EP) .................................... 18211163

(51) Int. Cl.
*A24F 40/485* (2020.01)
*A24D 3/17* (2020.01)
(Continued)

(52) U.S. Cl.
CPC .............. *A24F 40/485* (2020.01); *A24D 3/17* (2020.01); *A24F 40/20* (2020.01); *A24F 40/42* (2020.01);
(Continued)

(58) Field of Classification Search
CPC ........ A24F 40/485; A24F 40/20; A24F 40/42; A24F 40/46; A24F 40/10; A24F 40/40;
(Continued)

(56) References Cited

U.S. PATENT DOCUMENTS 9,687,028 B2    6/2017  Park
9,781,952 B2    10/2017 Rinker
(Continued)

FOREIGN PATENT DOCUMENTS

CN    104203018    12/2014
CN    106510001    3/2017
(Continued)

OTHER PUBLICATIONS

Merriam-Webster Dictionary, https://www.merriam-webster.com/dictionary/mesh (Year: 2024).*
(Continued)

*Primary Examiner* — Justin M Kratt
(74) *Attorney, Agent, or Firm* — Mueting Raach Group

(57) ABSTRACT

An aerosol-generating system, comprising: an aerosol generating substrate; an air inlet (16); an air outlet (28); an airflow passage (22) extending from the air inlet to the air outlet; an atomisation chamber (23) within the airflow passage; an aerosol-generating element within the atomisation chamber configured to atomize the aerosol-generating substrate to generate an aerosol; and an inlet filter (24) in the airflow passage between the air inlet and the atomisation chamber. Advantageously, the inlet filter is configured to allow for a flow of air into the airflow passage from the air inlet, through the inlet filter, but configured to prevent liquid, or liquid droplets greater than a predetermined size, within the airflow passage from passing through the inlet filter towards the air inlet.

14 Claims, 2 Drawing Sheets

(51) Int. Cl.
  *A24F 40/20* (2020.01)
  *A24F 40/42* (2020.01)
  *A24F 40/46* (2020.01)
  *B01D 39/10* (2006.01)
  *A24F 7/04* (2006.01)
  *A24F 40/10* (2020.01)
  *A24F 40/40* (2020.01)
  *A24F 40/48* (2020.01)
  *A24F 40/50* (2020.01)
  *B01D 39/12* (2006.01)
  *H02M 1/00* (2006.01)

(52) U.S. Cl.
  CPC .............. *A24F 40/46* (2020.01); *B01D 39/10* (2013.01); *A24F 7/04* (2013.01); *A24F 40/10* (2020.01); *A24F 40/40* (2020.01); *A24F 40/48* (2020.01); *A24F 40/50* (2020.01); *B01D 39/12* (2013.01); *B01D 2239/02* (2013.01); *B01D 2239/0208* (2013.01); *B01D 2239/0414* (2013.01); *B01D 2239/0428* (2013.01); *B01D 2239/0492* (2013.01); *B01D 2239/12* (2013.01); *B01D 2239/1208* (2013.01); *B01D 2239/1216* (2013.01); *H02M 1/0003* (2021.05)

(58) Field of Classification Search
  CPC . A24F 40/48; A24F 40/50; A24F 7/04; A24D 3/17; B01D 39/10; B01D 39/12; B01D 2239/02; B01D 2239/0208; B01D 2239/0414; B01D 2239/0428; B01D 2239/0492; B01D 2239/12; B01D 2239/1208; B01D 2239/1216; H02M 1/0003
  See application file for complete search history.

(56) References Cited

U.S. PATENT DOCUMENTS

| | | | |
|---|---|---|---|
| 10,750,784 B2 | 8/2020 | Mironov | |
| 10,834,968 B2 | 11/2020 | John | |
| 10,874,807 B2 | 12/2020 | Liu | |
| 10,925,531 B2 | 2/2021 | Bilat | |
| 11,006,676 B2 | 5/2021 | Force | |
| 2016/0073688 A1 | 3/2016 | Zade | |
| 2016/0367925 A1* | 12/2016 | Blackley | G08B 25/10 |
| 2017/0281883 A1 | 10/2017 | Li | |
| 2017/0340013 A1 | 11/2017 | Silvestrini | |
| 2018/0020730 A1 | 1/2018 | Alarcon | |
| 2019/0124983 A1 | 5/2019 | Rogers | |
| 2019/0274359 A1* | 9/2019 | Jain | H05B 1/0227 |
| 2020/0345070 A1* | 11/2020 | Ding | A24F 7/02 |
| 2021/0345681 A1* | 11/2021 | Cameron | A24F 40/53 |

FOREIGN PATENT DOCUMENTS

| | | |
|---|---|---|
| CN | 206138913 | 5/2017 |
| EP | 3387925 | 10/2018 |
| JP | 2010-104310 | 5/2010 |
| JP | 2012-533313 | 12/2012 |
| JP | 2018-500015 | 1/2018 |
| JP | 2018-514191 | 6/2018 |
| KR | 1020170074921 | 6/2017 |
| RU | 2670044 | 10/2018 |
| WO | WO 2009/132793 | 11/2009 |
| WO | WO 2015/117702 | 8/2015 |
| WO | WO 2018/000469 | 1/2018 |
| WO | WO 2018/055334 | 3/2018 |

OTHER PUBLICATIONS

Merriam-Webster Dictionary, https:/Avww.merriam-webster.com/dictionary/mesh (Year: 2024) (Year: 2024).*
PCT Search Report and Written Opinion for PCT/EP2019/084036 dated Mar. 9, 2020 (10 pages).
Extended European Search Report for Application No. 18211163.3 dated Jul. 11, 2019 (8 pages).
PCT International Preliminary Report on Patentability for PCT/EP2019/084036 dated Jun. 17, 2021 (7 pages).
Office Action issued in Russian for Application No. 2021116141 dated Mar. 23, 2023 (16 pages). English translation included.
Office Action issued in Japan for Application No. 2021-528950 dated Nov. 10, 2023 (8 pages). English translation included.
Notice of Allowance issued in Korea for Application No. 10-2021-7019591 dated Sep. 12, 2025 (4 pages). English translation included.

* cited by examiner

AEROSOL GENERATING SYSTEM AND CARTRIDGE WITH LEAKAGE PROTECTION

This application is a U.S. National Stage Application of International Application No. PCT/EP2019/084036 filed Dec. 6, 2019, which was published in English on Jun. 11, 2020 as International Publication No. WO 2020/115302 A1. International Application No. PCT/EP2019/084036 claims priority to European Application No. 18211163.3 filed Dec. 7, 2018.

The invention relates to aerosol-generating systems and in particular aerosol-generating systems that produce an aerosol for inhalation by a user.

One type of aerosol-generating system is an electrically heated smoking system that generates an aerosol for a user to inhale. Electrically heated smoking systems come in various forms. One popular type of electrically heated smoking system is an e-cigarette that vaporizes a liquid aerosol-forming substrate, or other condensed form of aerosol-forming substrate, to generate an aerosol.

WO2015/117702A describes an aerosol-generating system that heats a liquid substrate to form an aerosol. The heating is accomplished using a mesh of heating filaments. The liquid is conveyed to the mesh from a liquid reservoir by a capillary material on one side of the mesh. An airflow channel is on the other side of the mesh. Vaporized liquid aerosol-forming substrate passes through the mesh into the airflow channel. The mesh, together with the caliallry material, is used to prevent the passage of liquid droplets into the airflow channel. However, some liquid droplet may pass through or around the mesh into the airflow channel. Also, it is possible for some of the vaporized substrate to condense on the walls of the airflow channel and form into droplets of significant size.

The formation of large liquid droplets in the airflow channel is undesirable as large liquid droplets can result in an unpleasant experience for the user if they reach the user's mouth or otherwise escape from the system. Liquid droplets may also be damaging or detrimental to the operation of the other parts of the system, in particular electronic components of the system. And so it desirable to prevent liquid droplet from reaches those parts of the system.

In a first aspect of the invention, there is provided an aerosol-generating system, comprising:
an aerosol-forming substrate;
an air inlet;
an air outlet;
an airflow passage extending from the air inlet to the air outlet;
an atomisation chamber within the airflow passage;
an aerosol-generating element within the atomisation chamber configured to atomize the aerosol-forming substrate to generate an aerosol; and
an inlet filter in the airflow passage between the air inlet and the atomisation chamber.

Advantageously, the inlet filter is configured to allow for a flow of air into the airflow passage from the air inlet, through the inlet filter, but configured to prevent liquid droplets greater than a predetermined size within the airflow passage from passing through the inlet filter to the air inlet.

The inlet filter may comprise a mesh. The mesh may span the airflow passage so that air flowing from the air inlet to the air outlet through the airflow passage must pass through the mesh.

In some embodiments, the inlet filter comprises a mesh formed from wire having a diameter between about 10 µm and 100 µm. The inlet filter may comprise a mesh having interstices with a diameter of between 20 µm and 200 µm.

The inlet filter may comprise a plurality of meshes. The plurality of meshes may be arranged parallel to one another, spaced from one another along the airflow passage. Providing a plurality of meshes may reduce the possibility of liquid leakage through the filter.

The plurality of meshes may be different to one another. For example, the inlet filter may comprise a first mesh with a first aperture size and a second mesh with a relatively smaller aperture size, with the first mesh being positioned closer to the aerosol-generating element than the second mesh. With this arrangement, larger droplets are blocked by the first mesh. This prevents larger droplets from clogging the second mesh, which might significantly reduce airflow. Smaller droplets that pass through the first mesh, are blocked by the second mesh and may pass back through the first mesh to return to the atomisation chamber. The inlet filter may comprise more than two different meshes arranged in this manner.

The aerosol-generating system may further comprise an outlet filter in the airflow passage between the air outlet and the atomisation chamber. The outlet filer may be configured to allow for a flow of aerosol out of the airflow passage, through the outlet filter, but configured to prevent liquid droplets greater than a predetermined size within the airflow passage passing through the outlet filter.

The outlet filter may comprise a mesh. The outlet filter may comprise a plurality of meshes, in the same manner as described in relation to the inlet filter. The plurality of meshes may be arranged parallel to one another, spaced from one another along the airflow passage.

The plurality of meshes may be different to one another in order to effectively block different size droplets.

The outlet filter may comprise a mesh formed from wire having a diameter between about 10 μm and 100 μm. The outlet filter may comprise a mesh having interstices with a diameter of between 20 μm and 200 μm.

Where the inlet or outlet filter comprises a mesh, the mesh may advantageously be formed from a corrosion resistant material, such as stainless steel. The mesh may be coated with a material that increases the hydrophobicity or oleophobicity of the mesh. For example, nano-coatings of silicon carbide, silicon oxide, fluoropolymers, titanium oxide or aluminium oxide can be applied to the mesh, or to filaments prior to formation of a mesh from the filaments, by liquid phase deposition, vapour phase deposition or thermal plasma evaporation.

Where the inlet or outlet filter comprises a mesh formed from a plurality of filaments, the filaments may be arranged in a square weave so that the angle between filaments that contact one another is approximately 90°. However, other angles between filaments that contact one another may be used. Preferably the angle between filaments that contact one another is between 30° and 90°. The plurality of filaments may comprise a woven or non-woven fabric.

The airflow passage may extend in a straight line between the air inlet and the air outlet. This allows for a simple construction and assembly and reduces the likelihood of condensates collecting at particular locations within the airflow path.

The aerosol-generating system may comprise a substrate chamber for holding the aerosol-forming substrate. The aerosol-forming substrate may be a liquid a room temperature. In that case the substrate chamber may be described as a liquid reservoir. The aerosol-forming substrate may be a solid at room temperature, or may be in another condensed form, such as a gel, at room temperature. The aerosol generating element may be provided, at least in part, between the substrate chamber and the airflow passage.

The aerosol-generating element may comprise a heating element. Heating the aerosol-forming substrate may release volatile compounds from the aerosol-forming substrate as a vapour. The vapour may then cool within an airflow to form an aerosol.

The heating element may be configured to operate by resistive heating. In other words, the heating element may be configured to generate heat when an electrical current is passed though the heating element.

The heating element may be configured to operate by inductive heating. In other words, the heating element may comprise a susceptor that, in operation, is heated by eddy currents induced in the susceptor. Hysteresis losses may also contribute to the inductive heating.

The heating element may be arranged to heat the aerosol-forming substrate by conduction. The heating element may be in fluidic communication, e.g., direct or indirect contact, with the aerosol-forming substrate. The heating element may be arranged to heat the aerosol-forming substrate by convection. In particular, the heating element may be configured to heat a flow of air that subsequently passes through, or by, the aerosol-forming substrate.

The heating element may be fluid permeable. In particular, the heating element may permit vapour from the aerosol-forming substrate to pass through the heating element and into the atomisation chamber. The heating element may be positioned between the atomisation chamber and the aerosol-forming substrate chamber. The heating element may separate the atomisation chamber from the aerosol-forming substrate chamber. One side of the heating element may be in fluidic communication, e.g., direct or indirect contact, with the airflow passage and an opposite side of the heating element may be in fluidic communication, e.g., direct or indirect contact, with the aerosol forming substrate.

In some embodiments, the heating element is a generally planar, fluid permeable heating element, such as a mesh, perforated plate or perforated foil.

The heating element may comprise a mesh formed from a plurality of electrically conductive filaments. The electrically conductive filaments may define interstices between the filaments and the interstices may have a width of between 10 μm and 100 μm. Preferably the filaments give rise to capillary action in the interstices, so that in use, liquid aerosol-forming substrate to be vaporized is drawn into the interstices, increasing the contact area between the heater assembly and the liquid.

The electrically conductive filaments may form a mesh of size between 160 and 600 Mesh US (+/−10%) (i.e. between 160 and 600 filaments per inch (+/−10%)). The width of the interstices is preferably between 75 μm and 25 μm. The percentage of open area of the mesh, which is the ration of the area of the interstices to the total area of the mesh is preferably between 25 and 56%. The mesh may be formed using different types of weave or lattice structures. Alternatively, the electrically conductive filaments consist of an array of filaments arranged parallel to one another.

The electrically conductive filaments may have a diameter of between 8 μm and 100 μm, preferably between 8 μm and 50 μm, and more preferably between 8 μm and 39 μm.

The area of the mesh, array or fabric of electrically conductive filaments may be small, preferably less than or equal to 25 mm$^2$, allowing it to be incorporated in to a handheld system. The mesh, array or fabric of electrically conductive filaments may, for example, be rectangular and have dimensions of 5 mm by 2 mm.

The electrically conductive filaments may comprise any suitable electrically conductive material. Suitable materials include but are not limited to: semiconductors such as doped ceramics, electrically "conductive" ceramics (such as, for example, molybdenum disilicide), carbon, graphite, metals, metal alloys and composite materials made of a ceramic material and a metallic material. Such composite materials may comprise doped or undoped ceramics. Examples of suitable doped ceramics include doped silicon carbides. Examples of suitable metals include titanium, zirconium, tantalum and metals from the platinum group. Examples of suitable metal alloys include stainless steel, constantan, nickel-, cobalt-, chromium-, aluminium- titanium- zirconium-, hafnium-, niobium-, molybdenum-, tantalum-, tungsten-, tin-, gallium-, manganese- and iron-containing alloys, and super-alloys based on nickel, iron, cobalt, stainless steel, Timetal®, iron-aluminium based alloys and iron-manganese-aluminium based alloys. Timetal® is a registered trade mark of Titanium Metals Corporation. The filaments may be coated with one or more insulators. Preferred materials for the electrically conductive filaments are 304, 316, 304L, and 316L stainless steel, and graphite.

The electrical resistance of the mesh, array or fabric of electrically conductive filaments of the heater element is preferably between 0.3 and 4 Ohms. More preferably, the electrical resistance of the mesh, array or fabric of electrically conductive filaments is between 0.5 and 3 Ohms, and more preferably about 1 Ohm.

The system may comprise electrical contacts fixed to the heating element. Electrical current may be passed to and from the heating element through the electrical contacts. The electrical resistance of the mesh, array or fabric of electrically conductive filaments is preferably at least an order of magnitude, and more preferably at least two orders of magnitude, greater than the electrical resistance of the electrical contacts. This ensures that heat is generated by the heating element and not by the electrical contacts.

The aerosol-generating element may atomize the aerosol-forming substrate by a method other than heating. For example, the aerosol-generating element may comprise a vibrating membrane or may force the aerosol-forming substrate through a fine mesh.

The aerosol-forming substrate chamber may comprise a capillary material or other liquid retention material configured to ensure a supply of aerosol-forming substrate to the heating element or other aerosol-generating element.

The capillary material may have a fibrous or spongy structure. The capillary material preferably comprises a bundle of capillaries. For example, the capillary material may comprise a plurality of fibres or threads or other fine bore tubes. The fibres or threads may be generally aligned to convey liquid to the heater. Alternatively, the capillary material may comprise sponge-like or foam-like material. The structure of the capillary material forms a plurality of small bores or tubes, through which the liquid can be transported by capillary action. The capillary material may comprise any suitable material or combination of materials. Examples of suitable materials are a sponge or foam material, ceramic- or graphite-based materials in the form of fibres or sintered powders, foamed metal or plastics material, a fibrous material, for example made of spun or extruded fibres, such as cellulose acetate, polyester, or bonded polyolefin, polyethylene, terylene or polypropylene fibres, nylon fibres or ceramic.

The capillary material may be in fluidic communication, e.g., direct or indirect contact, with the electrically conductive filaments of the heating element. The capillary material may extend into interstices between the filaments. The heating element may draw liquid aerosol-forming substrate into the interstices by capillary action.

The housing may contain two or more different capillary materials, wherein a first capillary material, in contact with the heating element, has a higher thermal decomposition temperature and a second capillary material, in contact with the first capillary material but not in contact with the heating element has a lower thermal decomposition temperature. The first capillary material effectively acts as a spacer separating the heating element from the second capillary material, so that the second capillary material is not exposed to temperatures above its thermal decomposition temperature. As used herein, "thermal decomposition temperature" means the temperature at which a material begins to decompose and lose mass by generation of gaseous by products. The second capillary material may advantageously occupy a greater volume than the first capillary material and may hold more aerosol-forming substrate that the first capillary material. The second capillary material may have superior wicking performance to the first capillary material. The second capillary material may be a less expensive or have a higher filling capability than the first capillary material. The second capillary material may be polypropylene.

The aerosol-generating system may comprise an internal housing part defining the atomisation chamber. The internal housing part may be received in an external housing part. The external housing part may include a mouthpiece on which a user puffs to draw air through the airflow passage from the air inlet to the air outlet. The inlet filter may be positioned on the internal housing part. The inlet filter may be positioned on an external surface of the internal housing part. The outlet filter may be positioned on the internal housing part. The outlet filter may be positioned on an external surface of the internal housing part.

The inlet filter or the outlet filter, or both the inlet filter and the outlet filter, may be fixed to the internal housing part by clamping. For example, the outlet filter may be clamped between two housing portions. The inlet filter or the outlet filter, or both the inlet filter and the outlet filter, may be fixed to the internal housing part by overmoulding. In other words a portion of the internal housing part may be moulded around the inlet filter or the outlet filter.

The aerosol-generating system may comprise a plurality of air inlets. The aerosol-generating system may comprise an inlet filter in each air inlet. The aerosol-generating system may comprise a plurality of air outlets. The aerosol-generating system may comprise an outlet filter in each air outlet.

The aerosol-generating system may have an external housing part. The external housing part may be configured to be held by a user in a single hand. The external housing part may be formed from a plastics material or from a metal.

The aerosol-generating system may be refillable with aerosol forming substrate. The aerosol-forming substrate may be a liquid at room temperature. The aerosol-forming substrate may be a gel or may be solid at room temperature. The aerosol-forming substrate may be provided in the form or a capsule or tablet, or may be provided in a particulate form.

The aerosol-forming substrate is a substrate capable of releasing volatile compounds that can form an aerosol. The volatile compounds may be released by heating the aerosol-forming substrate.

The aerosol-forming substrate may comprise plant-based material. The aerosol-forming substrate may comprise tobacco. The aerosol-forming substrate may comprise a tobacco-containing material containing volatile tobacco flavour compounds, which are released from the aerosol-forming substrate upon heating. The aerosol-forming substrate may alternatively comprise a non-tobacco-containing material. The aerosol-forming substrate may comprise homogenized plant-based material. The aerosol-forming substrate may comprise homogenized tobacco material. The aerosol-forming substrate may comprise at least one aerosol-former. An aerosol-former is any suitable known compound or mixture of compounds that, in use, facilitates formation of a dense and stable aerosol and that is substantially resistant to thermal degradation at the operating temperature of operation of the system. Suitable aerosol-formers are well known in the art and include, but are not limited to: polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. Preferred aerosol formers are polyhydric alcohols or mixtures thereof, such as triethylene glycol, 1,3-butanediol and, most preferred, glycerine. The aerosol-forming substrate may comprise other additives and ingredients, such as flavourants and water.

The system may further comprise electric circuitry connected to the heater element and to an electrical power source, the electric circuitry configured to monitor the electrical resistance of the heating element or of one or more filaments of the heating element, and to control the supply of power to the heating element from the power source dependent on the electrical resistance of the heating element or specifically the electrical resistance of the one or more filaments.

The electric circuitry may comprise a microprocessor, which may be a programmable microprocessor, a microcontroller, or an application specific integrated chip (ASIC) or other electronic circuitry capable of providing control. The electric circuitry may comprise further electronic components. The electric circuitry may be configured to regulate a supply of power to the heating element. Power may be supplied to the heating element continuously following activation of the system or may be supplied intermittently, such as on a puff by puff basis. The power may be supplied to the heating element in the form of pulses of electrical current.

The system may be an electrically operated smoking system. The system may be a handheld aerosol-generating system. The aerosol-generating system may have a size comparable to a conventional cigar or cigarette. The smoking system may have a total length between approximately 30 mm and approximately 150 mm. The smoking system may have an external diameter between approximately 5 mm and approximately 30 mm.

The system advantageously comprises a power supply, typically a battery such as a lithium iron phosphate battery, within the main body of the housing. As an alternative, the power supply may be another form of charge storage device such as a capacitor. The power supply may require recharging and may have a capacity that allows for the storage of enough energy for one or more smoking experiences. For example, the power supply may have sufficient capacity to allow for the continuous generation of aerosol for a period of around six minutes, corresponding to the typical time taken to smoke a conventional cigarette, or for a period that is a multiple of six minutes. In another example, the power supply may have sufficient capacity to allow for a predetermined number of puffs or discrete activations of the heater.

The aerosol-generating system may comprise a cartridge and a device portion, the cartridge being coupled to the device portion in use. The cartridge may comprise the aerosol-forming substrate, the atomisation chamber and the aerosol-generating element. The device portion may comprise a power supply and control circuitry connected to the power supply. The device portion is coupled to the cartridge to allow for a supply of power from the power supply to the aerosol-generating element.

The cartridge may comprise the air outlet. The cartridge may comprise the outlet filter. The cartridge may comprise the air inlet and the inlet filter. The cartridge may comprise the internal housing part and the external housing part. The device portion may comprise a device housing that engages with the internal housing part or the external housing part, or both. The airflow passage may extend through the cartridge and the device portion or may extend through only the cartridge portion.

The electrical contacts may be in the cartridge and may engage with corresponding electrical contacts on the device portion.

In a second aspect of the invention, there is provided a cartridge for an electrically heated aerosol-generating system, the cartridge comprising:
an aerosol-generating substrate;
an air inlet;
an air outlet;
an airflow passage extending from the air inlet to the air outlet;
an atomisation chamber within the airflow passage;
an aerosol-generating element within the atomisation chamber configured to atomize the aerosol-generating substrate to generate an aerosol; and
an inlet filter in the airflow passage between the air inlet and the atomisation chamber.

The cartridge of the second aspect may comprise the features of the cartridge described in relation to the first aspect of the invention.

The invention provides a number of advantages. In particular the invention reduces liquid leakage from an aerosol-generating system or from cartridge in an aerosol-generating system. The provision of an inlet filter removes the need for a separate inlet seal or cap that must be removed prior to use. The provision of an inlet filter also provides some protection to the aerosol-generating element from debris of other objects entering the airflow passage from outside of the system or cartridge. The invention also provides a system that is robust and simple to manufacture.

Embodiments of the invention will now be described, by way of example only, with reference to the accompanying drawings, in which.

Figure 1:
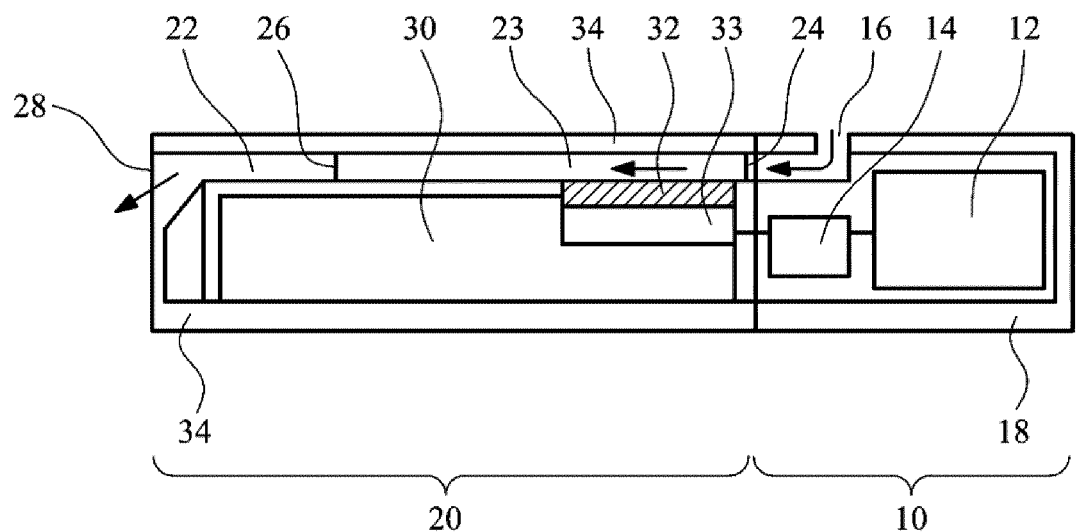
FIG. 1 is a schematic illustration of an aerosol-generating system in accordance with the invention.

FIG. 1 is a schematic illustration of an aerosol-generating system in accordance with the invention. The aerosol-generating system is a handheld smoking system configured to generate aerosol for user inhalation. In particular, the system shown in FIG. 1 is a smoking system that generates an aerosol containing nicotine and flavour compounds.

The system of FIG. 1 comprises two parts, a device portion 10 and a cartridge 20. In use the cartridge 20 is attached to the device portion 10.

The device portion 10 comprises a device housing 18 that holds a rechargeable battery 12 and electrical control circuitry 14. The rechargeable battery 12 is a lithium iron phosphate battery. The control circuitry 14 comprises a programmable microprocessor and an airflow sensor.

The cartridge 20 comprises a cartridge housing 34 that is attached to the device housing 18 by a snap-fit connection. The cartridge housing 34 holds an aerosol-generating element, which in this example is a heating element 32. The heating element 32 is a resistive heating element. Power is provided to the heating element from the battery 12, under the control of the control circuitry, as will be described. The cartridge also holds an aerosol-forming substrate within a substrate chamber 30. In this example, the aerosol-forming substrate is a liquid mixture at room temperature and comprises nicotine, flavours, an aerosol-former, such a glycerol or propylene glycol, and water. A capillary material 33 is provided in the substrate chamber 30 and is arranged to promote delivery of the aerosol-forming substrate to the heating element, regardless of the orientation of the system relative to gravity.

An airflow passage 22 is defined through the system. In this example, a portion of the airflow passage is through the cartridge 20 and a portion of the airflow passage is through the device portion 10. The airflow sensor included in the control circuitry is positioned to detect airflow through the portion of the airflow passage in the device portion. The airflow passage extends from an air inlet 16 to an air outlet 28. The air outlet 28 is in a mouthpiece end of the cartridge. When the user puffs on the mouthpiece end of the cartridge, air is drawn from the air inlet 16, through the airflow passage 22, to the air outlet 28.

Part of the airflow passage forms an atomizing chamber 23. The heating element 32 is positioned in the atomizing chamber. The heating element 32 is a stainless steel mesh heating element. The heating element 32 is generally planar, with one side in fluidic communication, e.g., direct or indirect contact, with the liquid in the substrate chamber 30 and the opposite side in fluidic communication, e.g., direct or indirect contact, with the air passing through the atomizing chamber 23. In operation, liquid aerosol-forming substrate heated by the heating element is vaporized to form a vapour. The vapour can pass through the mesh heating element into the atomizing chamber. The vapour is entrained in the air flowing through the atomizing chamber 23 and cools to form an aerosol before exiting the system through the air outlet 28.

An inlet filter 24 is provided in the airflow passage on an upstream side of the heating element. An outlet filter 26 is provided in the airflow passage on a downstream side of the heating element. In this context, upstream and downstream are defined by reference to the direction of airflow through the airflow passage 22 during use of the device in the intended manner. The atomisation chamber is positioned between the inlet filter and the outlet filter.

The inlet filter 24 comprises a mesh. The mesh prevents liquid droplets having a diameter greater than a particular diameter from leaving the atomisation chamber 23 through the air inlet 24. Similarly, the outlet filter 26 comprises a mesh. The outlet filter mesh prevents liquid droplets having a diameter greater than a particular diameter from leaving the atomisation chamber 23 through the air outlet 26. The mesh of the inlet filter may the same or different to the mesh of the outlet filter. A particular example is described in detail with reference to FIGS. 2 and 3.

The system, consisting in this example of a device portion and a cartridge, is elongate, having a length significantly greater than its width or its thickness. The mouthpiece end is at one end of the length of the system. This shape allows the system to be comfortably held by a user in a single hand when using the system. The length of the system may be said to extend in a longitudinal direction. The airflow passage extends in the longitudinal direction past the fluid permeable heating element 32. The fluid permeable heating element is generally planar and extends parallel to the longitudinal direction. The heating element may also be elongate, with its length extending in the longitudinal direction. This arrangement allows for a heating element with a relatively large surface area to be accommodated in a slim, easy to hold system.

In operation, the heating element may be activated only during user puffs or may be activated continuously following the device being switched on. In the first case, user puffs are detected when the flow sensor detects an airflow through the airflow passage above a threshold airflow rate. In response to the output of the flow sensor, the control circuitry supplies power to the heating element. The supply of power to the heating element may be provided for a predetermined period of time following detection of a user puff or may be controlled until a switch-off condition is met, based on signals from the flow sensor and/or based on other inputs received from by the control circuitry, such as measures of heating element temperature or resistance. In one example, the heating element is supplied with 6 Watts of power for 3 seconds following detection of a user puff. When the heating element is supplied with power it heats up. When it is sufficiently hot, the liquid aerosol-forming substrate in proximity to the heating element is vaporized.

In the second case, the heating element is supplied with power continuously during operation, following activation of the system. Activation may be based on a user input to the system, such as pressing a button. In one embodiment, the heating element is supplied with 3.3 Watts of power following activation of the device, regardless of user puffs. Again, this may be adjusted based on other inputs to the control circuitry, such as measured heating element temperature or resistance. The system may be switched off following a predetermined time after activation or based on a further user input.

As another alternative, a hybrid power supply scheme may be used in which a lower power, such as 3.3 Watts is supplied between user puffs but a higher power, such as 7 Watts, is supplied for 2 seconds following detection of each user puff. This may result in a greater volume of aerosol being generated. In one nonlimiting configuration, a power of about 7 Watts heats the mesh heating element to a temperature of about 220° C.

The vapour generated passes through the mesh heating element into the atomisation chamber where it is entrained in the airflow through the airflow passage. The vapour cools within the airflow to form an aerosol. The aerosol passes through the outlet filter 26 and into the user's mouth.

The liquid that is vaporized by the heating element leaves the capillary material 33. This liquid is replaced by liquid still remaining in the substrate chamber 30, so that there is liquid proximate to the heating element ready for the next user puff.

It is possible that not all of the vapoured aerosol-forming substrate is drawn out of the system by the user puffs. In that case, the aerosol-forming substrate may condense to form large droplets within the atomizing chamber 23. It may also be possible for some liquid to pass through the heating element without being vaporized, either during use or between uses of the system. The inlet filter 24 prevents any large droplets within the atomizing chamber from escaping towards the air inlet 16. The inlet filter thus protects both the user and the electronic components and battery within the device portion from liquid leakage from the cartridge.

The outlet filter similarly prevents large liquid droplets escaping the atomizing chamber towards the air outlet 28. Large droplets may provide an unpleasant experience for the user if they reach the user's mouth.

The inlet filter may comprise more than one layer of mesh. The layers may have different sizes. The inlet filter may comprise a finer mesh or meshes than the outlet filter because the outlet filter must allow the passage of some liquid droplets in the aerosol formed, whereas it is desirable to substantially prevent all liquid droplets passing to the air inlet, provided that the inlet filter allows sufficient air flow into the atomisation chamber from the air inlet.

Figure 2:
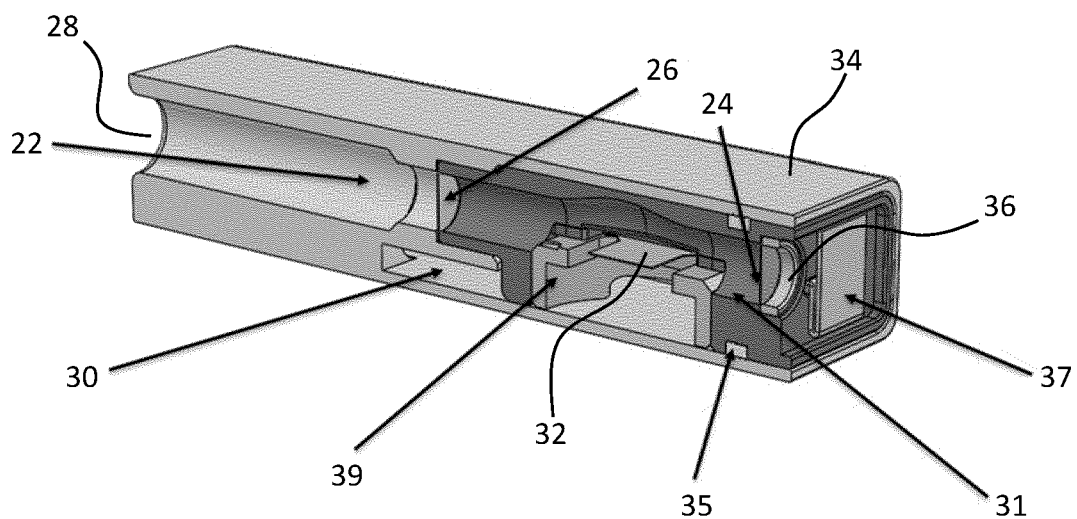
FIG. 2 is a cross-section through a cartridge in accordance with an embodiment of the invention.
Figure 3:
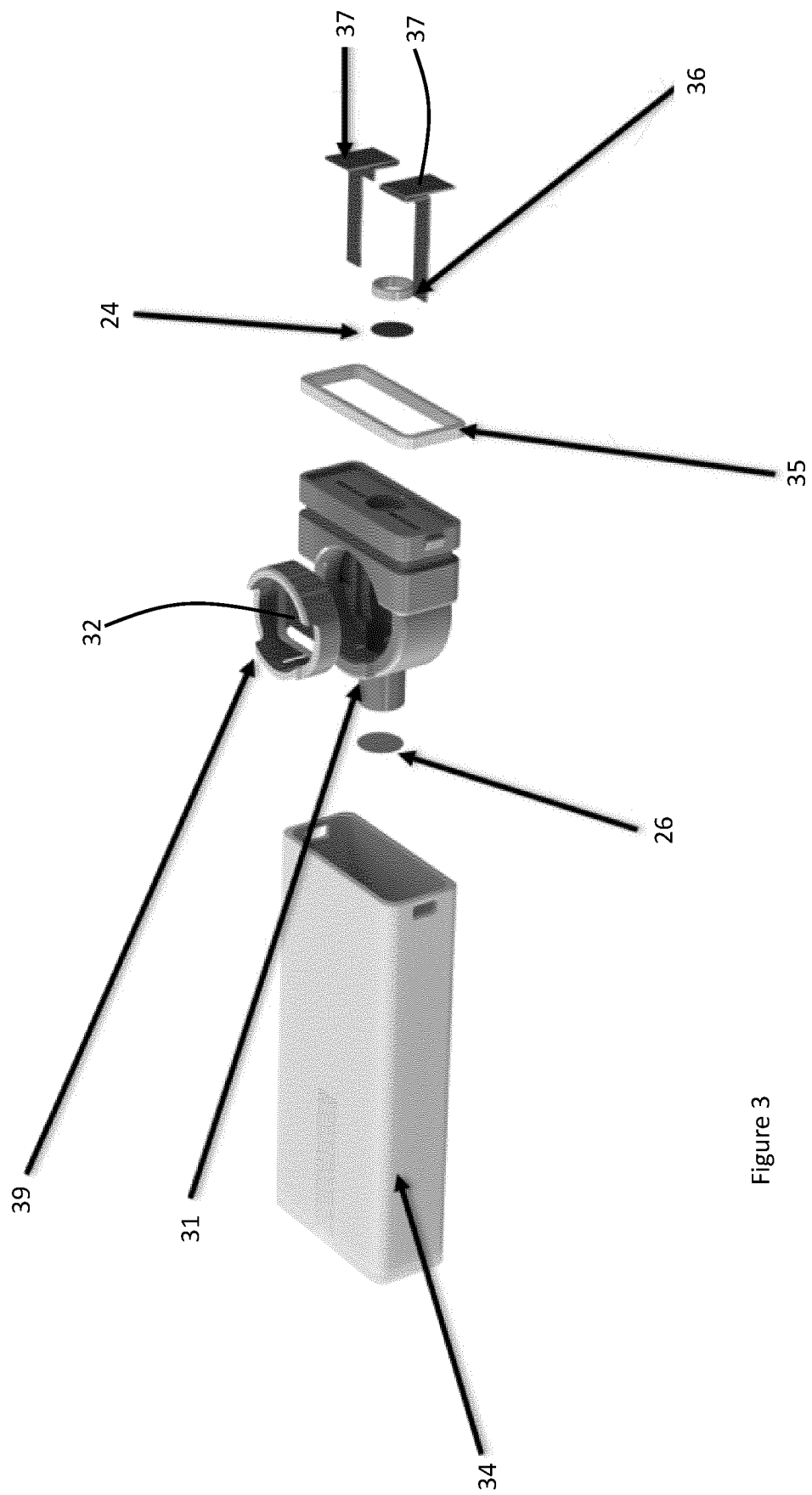
FIG. 3 is an exploded view of the cartridge of FIG. 2.

FIG. 2 is a perspective cross-section through a cartridge in accordance with one embodiment of the invention. FIG. 3 shows the components of the cartridge of FIG. 3 in exploded form.

The cartridge comprises an external housing 34. Within the external housing 34 is an internal housing 31. The internal housing holds the heater assembly. The heater assembly comprises a heater mount 39 which supports the mesh heating element 32. A capillary material (not shown) is held within the heater mount 39, in fluidic communication, e.g., direct or indirect contact, with the heating element 32. The cartridge also comprises electrical contact elements 37 that extend between the mesh heating element and an external surface of the cartridge, at the device portion end of the cartridge (opposite the mouthpiece end). The electrical contact elements 37 interface with corresponding electrical contacts on a device portion of the system to allow for the supply of power to the heating element 32. An inlet filter 24 is clamped to the inlet end of the internal housing 31 by a clamping ring 36. An outlet filter 26 is clamped between the internal housing 31 and the external housing 34. The airflow passage is defined though the internal housing and the external housing and passes through both filters 24, 26. The internal housing defines the atomisation chamber. An elastomer sealing element 35 is provided to provide a liquid tight seal between the internal housing 31 and the external housing 34.

In this example, the inlet filter and the outlet filter 26 are formed from identical meshes. The mesh of the inlet filter is made of stainless steel wire having a diameter of about 3 μm to about 50 μm. The apertures of the mesh have a diameter of about 10 μm to about 100 μm. The mesh is coated with silicon carbide.

The mesh of the heating element 32 is also formed from stainless steel and has a mesh size of about 400 Mesh US (about 400 filaments per inch). The filaments have a diameter of around about 3 μm to about 50 μm, e.g., about 16 μm. The filaments forming the mesh define interstices between the filaments. The interstices in this example have a width of around 10 μm to 50 μm, e.g., about 37 μm, although larger or smaller interstices may be used. Using a mesh of these approximate dimensions allows a meniscus of aerosol-forming substrate to be formed in the interstices, and for the mesh of the heater assembly to draw aerosol-forming substrate by capillary action. The open area of the heating element mesh, i.e. the ratio of the area of interstices to the total area of the mesh is advantageously between 15% and 75%, e.g., between 25 and 56%. The total electrical resistance of the heater assembly is around 0.5 Ohms to about 1 Ohm.

The internal housing and external housing may be formed from metal or robust plastics materials. Similarly the heater mount may be formed from a heat resistant plastics material.

The cartridge of FIGS. 2 and 3 is simple to assemble. The assembly of the internal housing 31, the heater assembly, the inlet filter 24, clamping ring 36, outlet filter 26 and sealing element 35 may be described as an atomizer assembly. The atomizer assembly is assembled first. The atomizer assembly is then pushed into the external housing 34. A pair of protrusions on the internal housing snap into corresponding apertures on the external housing to secure the internal housing to the external housing. The chamber 30 holding the aerosol-forming substrate is defined by both the internal and external housings. The external housing may contain the liquid (or another condensed phase) aerosol-forming substrate before the atomizer assembly is attached. Alternatively, the aerosol-forming substrate chamber may be filled after the atomizer assembly is attached to the external housing through a filling port (not shown).

The cartridge of FIGS. 2 and 3 operates in the manner described in relation to FIG. 1.

In the examples described, both the inlet filter and the outlet filter are in the cartridge. However, it should be clear that the inlet filter, for example, could be positioned within the device portion. Similarly, the outlet filter may be positioned in a separate, removable, mouthpiece element. It should also be clear that the shape and size of the airflow channel and in particular the atomisation chamber may be altered to provide for particular, desired properties of the aerosol delivered to the user.

It should be clear that, although the examples described use a liquid aerosol-forming substrate, the provision of an inlet filter or an outlet filter or both an inlet filter and an outlet filter is beneficial in systems that use other forms of aerosol-forming substrate. An aerosol-forming substrate that is a solid or a gel at room temperature, may still release volatile components that condense into a liquid form in the atomizing chamber. For example, the aerosol-forming substrate may be provided as a gel tablet. The aerosol-forming substrate may comprise particulate or cut tobacco.

It should also be clear that, although the examples describe the use of a resistive heating element to form an aerosol, the provision of an inlet filter or an outlet filter or both an inlet filter and an outlet filter is beneficial in systems that operate using different kinds of heating element, such as an inductively heated heating element. The heating element need not be a fluid permeable heating element positioned between the aerosol-forming substrate and the airflow passage. The heating element may be an oven heater that heats the walls of the aerosol-forming substrate chamber to generate a vapour. The vapour may pass to the airflow passage through a valve or a vapour permeable membrane or element. Similarly, the provision of filters in the airflow passage may be beneficial for systems that form an aerosol by first heating the airflow in the airflow passage and subsequently passing the heated air through or past the aerosol-forming substrate. The provision of filters in the airflow passage may be beneficial for systems that form an aerosol by means other than heating.

The invention claimed is:
1. An aerosol-generating system, comprising:
an aerosol-forming substrate;
an air inlet;
an air outlet;
an airflow passage extending from the air inlet to the air outlet;
an atomisation chamber within the airflow passage;
an aerosol-generating element within the atomisation chamber configured to atomise the aerosol-forming substrate to generate an aerosol; and
an inlet filter in the airflow passage between the air inlet and the atomisation chamber;
wherein the inlet filter comprises a plurality of meshes, wherein interstices of a first mesh of the plurality of meshes has a different aperture size to interstices of a second mesh of the plurality of meshes, wherein the first mesh and the second mesh are arranged in parallel with one another and spaced apart from one another along the airflow passage.

2. The aerosol-generating system according to claim 1, further comprising an outlet filter in the airflow passage between the air outlet and the atomisation chamber.

3. The aerosol-generating system according to claim 2, wherein the outlet filter comprises a mesh.

4. The aerosol-generating system according to claim 1, wherein the inlet filter comprises a mesh formed from wire having a diameter between about 10um and 100um.

5. The aerosol-generating system according to claim 1, wherein the inlet filter comprises a mesh having interstices with a diameter of between 20um and 200um.

6. The aerosol-generating system according to claim 1, wherein the airflow passage extends in a straight line between the air inlet and the air outlet.

7. The aerosol-generating system according to claim 1, wherein the aerosol-generating element comprises a heating element.

8. The aerosol-generating system according to claim 7, wherein the heating element is a mesh heating element.

9. The aerosol-generating system according to according to claim 1, wherein the inlet filter comprises a hydrophobic or oleophobic coating.

10. The aerosol-generating system according to claim 1, comprising:
a cartridge coupled to a device portion,
wherein the cartridge comprises:
the aerosol-forming substrate, the atomisation chamber and the aerosol generating element;
wherein the device portion comprises a power supply and control circuitry connected to the power supply, and is coupled to the cartridge to allow for a supply of power from the power supply to the aerosol-generating element.

11. The aerosol-generating system according to claim 10, wherein the cartridge comprises the air inlet and the inlet filter.

12. The aerosol-generating system according to claim 1, wherein the interstices of the first mesh have a larger aperture size than the interstices of the second mesh, wherein the first mesh is downstream from the second mesh.

13. A cartridge for an electrically heated aerosol-generating system, the cartridge comprising a cartridge housing, the cartridge housing comprising:
an aerosol-forming substrate;
an air inlet situated at a first portion of the cartridge housing;
an air outlet situated at a second portion of the cartridge housing;
an airflow passage extending through the cartridge housing from the air inlet to the air outlet;
an atomisation chamber within the airflow passage;

an aerosol-generating element within the atomisation chamber configured to atomise the aerosol-forming substrate to generate an aerosol; and an inlet filter in the airflow passage between the air inlet and the atomisation chamber;

wherein the inlet filter comprises a plurality of meshes, wherein interstices of a first mesh of the plurality of meshes has a different aperture size to interstices of a second mesh of the plurality of meshes, wherein the first mesh and the second mesh are arranged in parallel with one another and spaced apart from one another along the airflow passage.

14. The cartridge according to claim 13, wherein the interstices of the first mesh have a larger aperture size than the interstices of the second mesh, wherein the first mesh is downstream from the second mesh.

* * * * *